United States Patent [19]
Valsamis et al.

[11] Patent Number: 5,487,602
[45] Date of Patent: Jan. 30, 1996

[54] MULTI-SCREW, EXTRUSION-COMPOUNDING MACHINE WITH MODULAR MIXING ELEMENTS

[75] Inventors: Lefteris N. Valsamis, Stratford; Eduardo L. Canedo, Beacon Falls; Jose M. Pereira, Bridgeport; Douglas V. Poscich, East Hampton, all of Conn.

[73] Assignee: Farrel Corporation, Ansonia, Conn.

[21] Appl. No.: 253,397

[22] Filed: Jun. 3, 1994

[51] Int. Cl.$^6$ ........................................ B29B 7/48
[52] U.S. Cl. .............................. 366/81; 366/85
[58] Field of Search .................... 366/79, 81, 83–85, 366/88, 90, 319, 321, 323; 425/204, 208, 209

[56] References Cited

U.S. PATENT DOCUMENTS

| | | | |
|---|---|---|---|
| 3,195,868 | 7/1965 | Loomans et al. | 366/85 |
| 3,829,067 | 8/1974 | Matsuoka | 366/81 |
| 4,752,135 | 6/1988 | Loomans | 366/85 |
| 5,267,788 | 12/1993 | Rockstedt | 366/85 |
| 5,273,356 | 12/1993 | Piccolo, Sr. et al. | 366/84 |

FOREIGN PATENT DOCUMENTS

| | | | |
|---|---|---|---|
| 56-136632 | 10/1981 | Japan | 366/83 |
| 56-136633 | 10/1981 | Japan | 366/83 |

*Primary Examiner*—David Scherbel
*Assistant Examiner*—Charles E. Cooley
*Attorney, Agent, or Firm*—G. Kendall Parmelee; Parmelee, Bollinger & Bramblett

[57] ABSTRACT

Multi-screw, extrusion-compounding machines having co-rotating screw assemblies incorporating sets of modular mixing elements of non-symmetrical geometries with relatively large wing tip clearances. These sets of non-symmetrical modular mixing elements are removably mountable at any suitable axial locations along their respective rotationally-driven screw shafts for optimizing performance in relationship to particular plastic material and particular additives being compounded. The non-symmetrical geometries provide dynamic wedging pressurization for repeatedly propelling relatively large circumferential flows of the plastic material through large shear clearances. Due to the relatively large shear clearances, the plastic material is mixed at less elevated and more uniform temperatures than usually occurs with use of prior symmetrical kneading blocks or kneading discs. At less elevated temperatures most plastic materials exhibit increased viscosities. Thus, the resultant increased viscosities enable the plastic material to be processed at higher shear stresses for enhancing dispersive mixing, in spite of the relatively large clearances which are being utilized. Thus, operators of extrusion-compounding machines are provided with desirable flexibility in adapting them for enhanced performance in matching machine processing functions with the processing characteristics and parameters of plastic materials and additives being compounded.

22 Claims, 10 Drawing Sheets

MULTI-SCREW, EXTRUSION-COMPOUNDING MACHINE WITH MODULAR MIXING ELEMENTS

FIELD OF THE INVENTION

The invention relates to the field of co-rotating, intermeshing, multi-screw, extrusion-compounding machines for plastic material.

More particularly, the invention relates to such machines having co-rotation screws incorporating sets of modular mixing elements of non-symmetrical geometries with relatively large wing tip clearances and wherein such sets of non-symmetrical modular mixing elements can be mounted at any suitable axial location along their respective screw shafts, wherein usage of kneading blocks or kneading discs may be avoided.

BACKGROUND OF THE INVENTION

Intermeshing co-rotating twin-screw extruders as known in the art conventionally utilize a number of different elements mounted along the respective extruder shafts according to a sequence of process functions that the extruder is to perform.

In general, the screws in such an extruder include a number of transporting (forward-conveying) screw elements designed to accept the plastic material and additives and to convey them to a special section of the extruder dedicated to transforming the plastic material into a thermally homogeneous compound melt including the additives. This special section of the extruder conventionally includes a number of kneading elements, usually in the form of blocks or discs, designed to impart high energy per unit volume into the plastic material with the additives. Rotational drive energy imparted to the kneading elements on the extruder screws is dissipated into the plastic material causing heating and inducing mixing of the various additives into a plastic compound melt.

These kneading elements conventionally employ a special cross-section profile which is designed to provide "effective scraping" (very small clearances such as a millimeter or less) between adjacent kneading elements and usually also effective scraping between an outer diameter of the kneading element and the inner wall of the barrel. As a result of this very small clearance geometry, intensive energy is dissipated in the kneading section of the extruder, producing localized extreme heating. This heat energy, if not promptly and continuously removed, results in overheating of the compound melt with possible degradation of the plastic material.

Another problem associated with kneading discs in general is their capability of generating localized high pressures, especially in the vicinity of the kneading disc tip. These localized high pressures result in shaft-deflecting forces which push the screw shafts towards the inner surfaces of the barrel walls, thus accelerating wear of the extruder. From a process point-of-view, such localized high pressures may re-fuse back together and agglomerate solid particles previously broken apart, thereby acting contrary to the objective of obtaining a homogeneous compound melt. Additionally, in such prior machines when dealing with dispersive or extensive mixing, various different fluid particles are being exposed to highly non-uniform kneading shear rates. Consequently, the kneading shearing action must be repeated many times to ensure that all fluid particles have been exposed to equal levels of shear and/or thermal history.

SUMMARY

The invention is shown embodied in extrusion-compounding machines having co-rotating, intermeshing screws incorporating modular mixing elements of identical geometries having relatively large clearances and wherein their non-symmetrical geometries provide dynamic wedging pressurization for driving relatively large circumferential flows of the plastic material through large shear clearances. Thus, advantageously, the large circumferential flows of plastic material are driven repeatedly by dynamic wedging pressurization action so as to pass repeatedly through the large shear clearances. By virtue of these relatively large shear clearances, the plastic material is being mixed at lower and more uniform temperatures than usually occurs with use of typical prior art kneading elements. In most plastic materials viscosity diminishes with elevating temperatures. Consequently, these lower temperatures enable the plastic material to be processed at higher viscosities than typically occurring in prior art extrusion-compounding machines. Due to the higher viscosities of the lower-temperature plastic material, shear stresses in the material are higher, thereby enhancing dispersive mixing in spite of the relatively large clearances which are being utilized.

Among further advantages of the illustrative embodiments of the invention are those arising from the fact that by using various sets of modular mixing elements and by mounting them at selectable positions along the length of the screws, operators are provided with desirable flexibility in adapting extrusion-compounding machines for optimum performance in relationship to the particular plastic material and particular additives being compounded. The modular mixing elements can be arranged and assembled in various sets in a wide range of axial positions and configurations for enhancing processing characteristics, zonal temperature levels and magnitudes and axial locations of dynamic wedging-shearing actions within the twin barrels and for matching these dynamic effects with desired properties of plastic materials and additives being compounded.

BRIEF DESCRIPTION OF THE DRAWINGS

The invention, together with further objects, features, advantages and aspects thereof, will be more clearly understood from the following detailed description considered in conjunction with the accompanying drawings which are not drawn to scale with the emphasis instead being placed upon clearly illustrating the principles of the invention. Like reference numerals indicate like elements, like components or similar geometric forms throughout the different views.

The accompanying drawings which are incorporated in and constitute a part of the specification, illustrate presently preferred embodiments of the invention and, together with the general description set forth above and the detailed description of the preferred embodiments set forth below, serve to explain the principles of the invention.

In the drawings:

FIG. 1 is a schematic longitudinal side elevational sectional view of a multi-screw, extrusion-compounding machine having intermeshing, co-rotating twin screws (only one is seen in FIG. 1) incorporating non-symmetrical modular mixing elements having relatively large wing tip clearances.

FIGS. 1A and 1B are enlargements of portions of FIG. 1 wherein a respective set of modular mixing elements is shown in each FIGURE.

Figure 1:
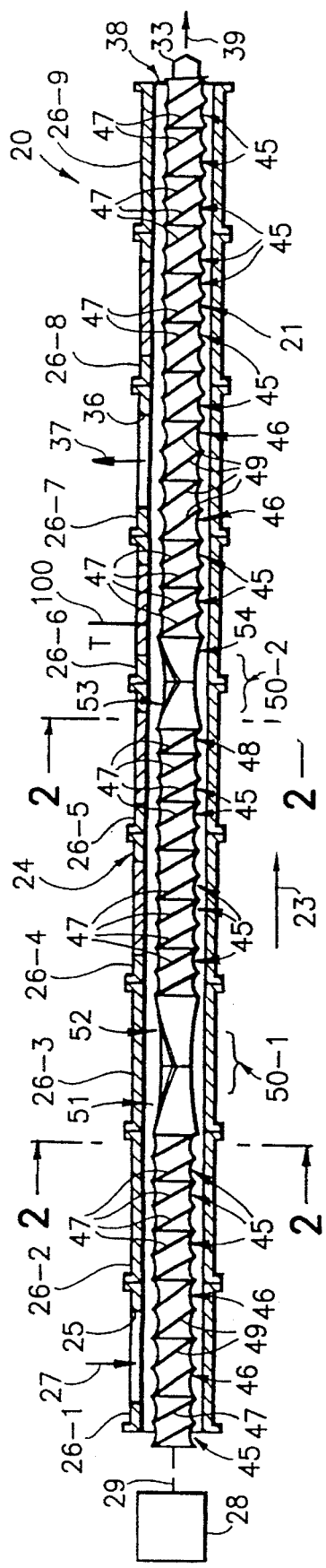
Figure 1A:
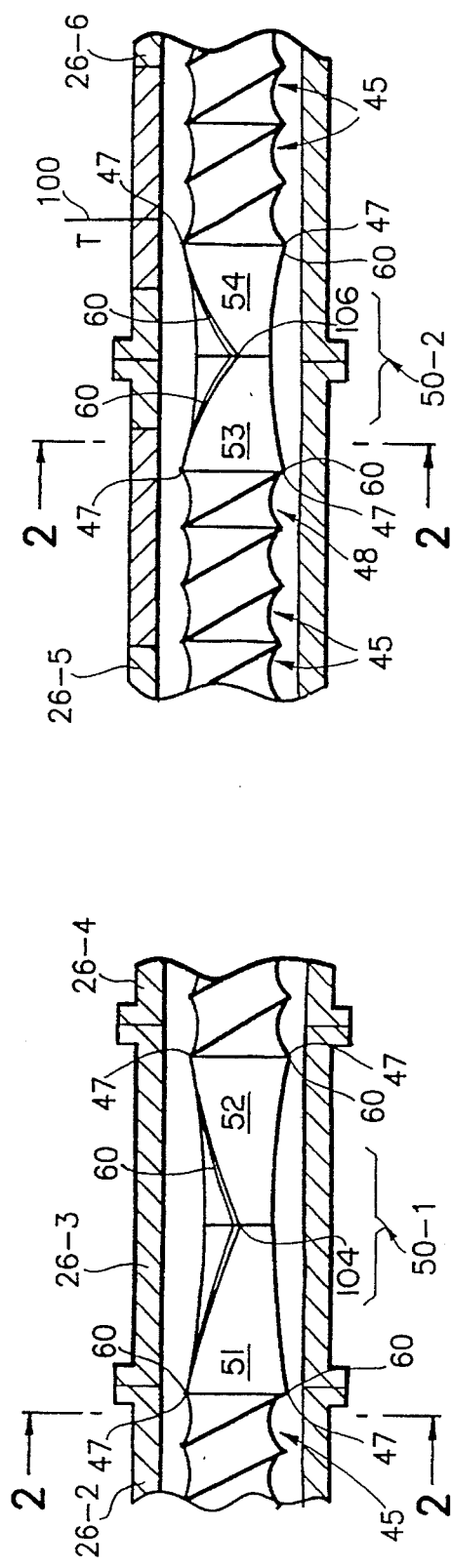
Figure 1B:
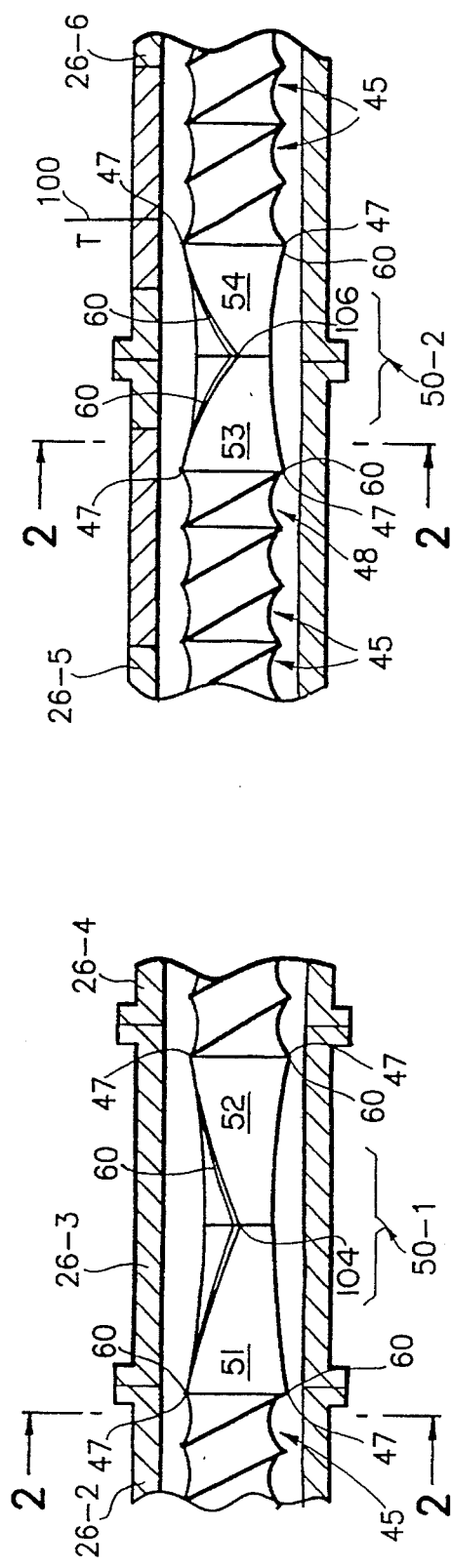
Figure 2:
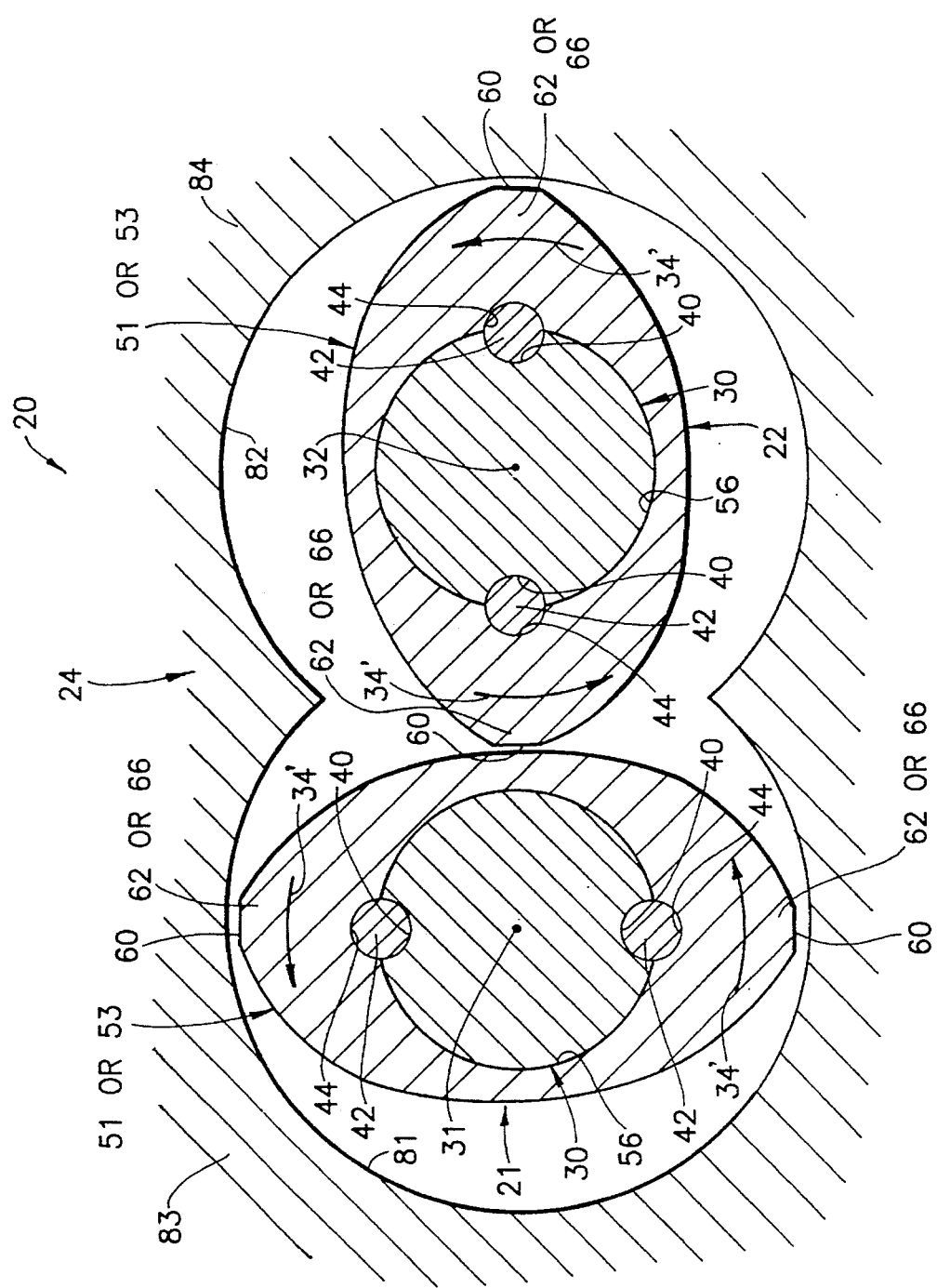

FIG. 2 is an enlarged cross-sectional view looking downstream taken along either of the planes 2—2 in FIG. 1 or along the plane 2—2 in FIG. 1A or plane 2—2 in FIG. 1B near upstream ends of respective modular mixing elements.

Figure 3:
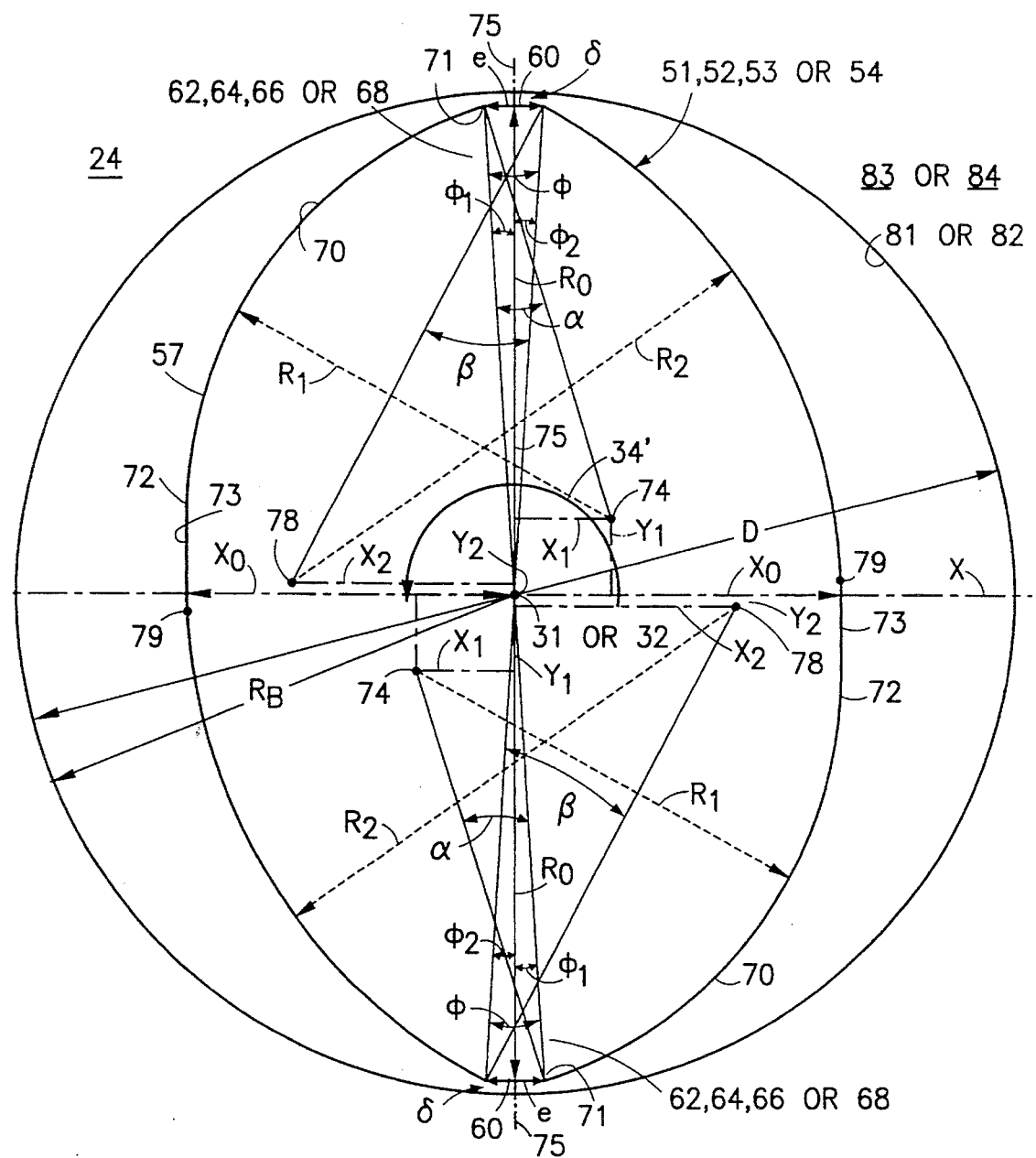

FIG. 3 is a further enlarged view of one of the modular mixing elements of FIG. 2 for purposes of explaining advantageous non-symmetrical geometric relationships provided in these modular mixing elements.

Figure 3A:
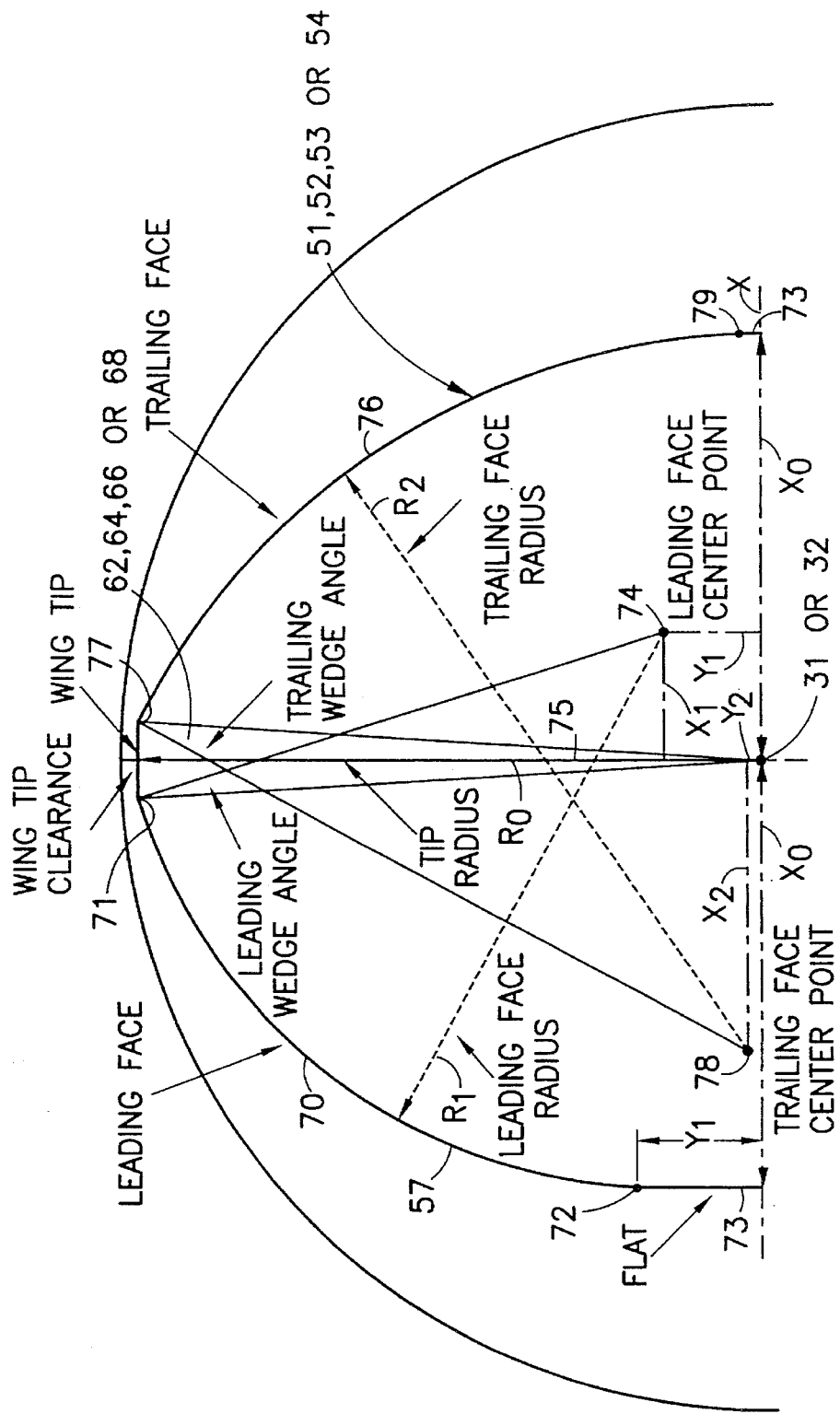

FIG. 3A shows an upper half of FIG. 3 for purposes of further explanation.

Figure 3B:
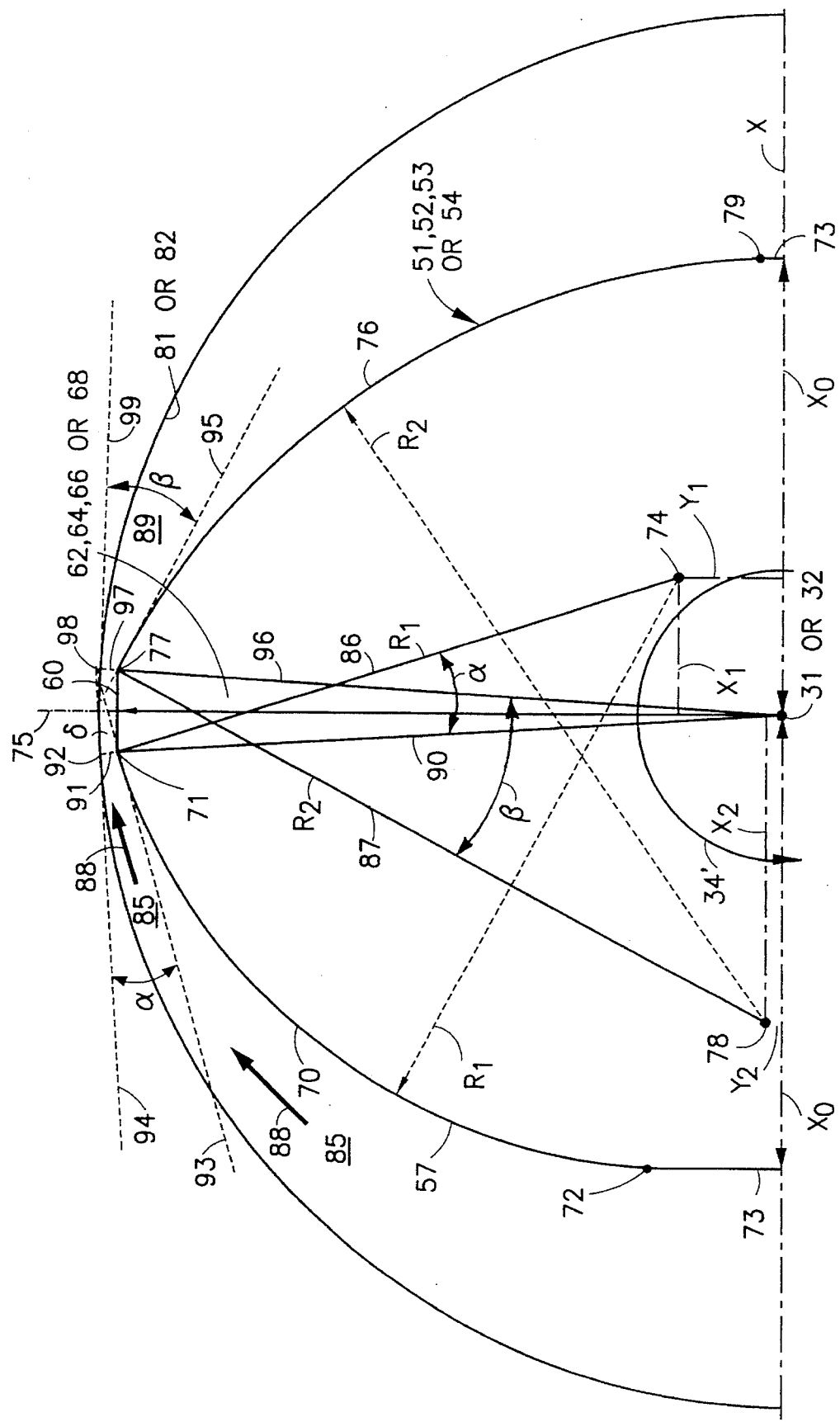

FIG. 3B is a further enlargement of the top half of FIGS. 3 and 3A for purposes of explanation.

Figure 4A:
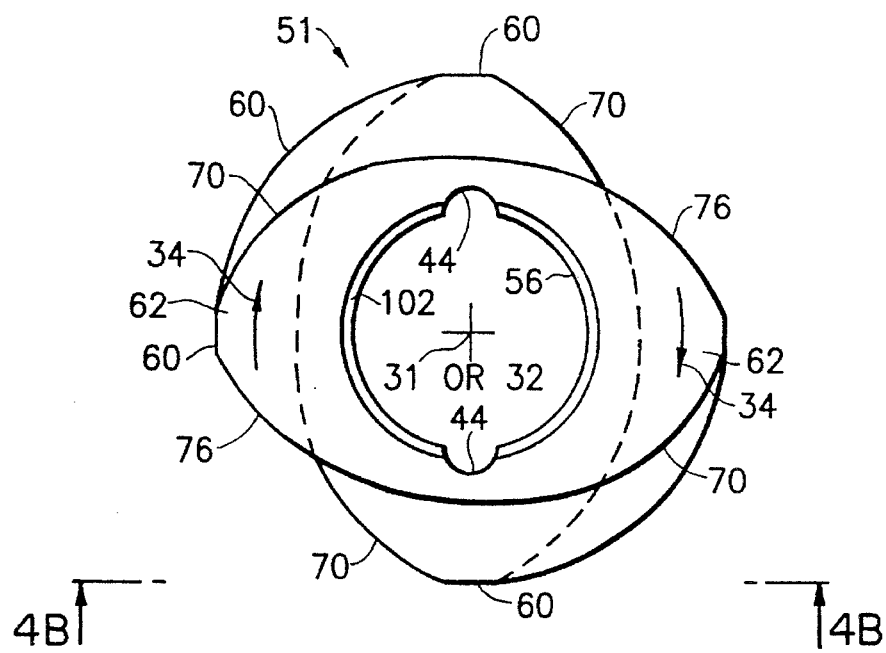
Figure 4B:
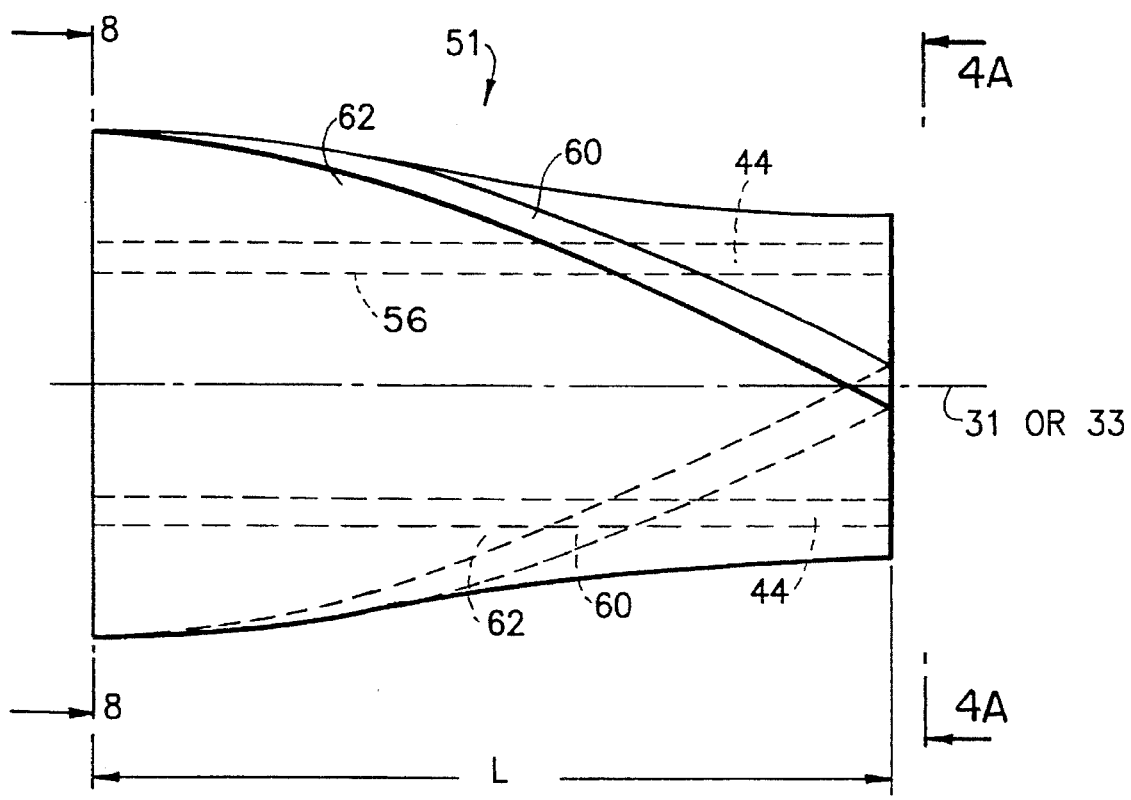

FIGS. 4A and 4B are end elevational and side elevational views, respectively, of a non-symmetrical modular mixing element with two axially-extending wings each having a right-hand ("RH") twist. An RH twist is a forward-pumping twist, which may also be referred to as a downstream-pumping twist. FIG. 4A is an end view of the mixing element in FIG. 4B as seen looking upstream, as indicated by arrows 4A—4A. FIG. 4B is a side view of the mixing element in FIG. 4A, as shown by arrows 4B—4B.

Figure 5A:
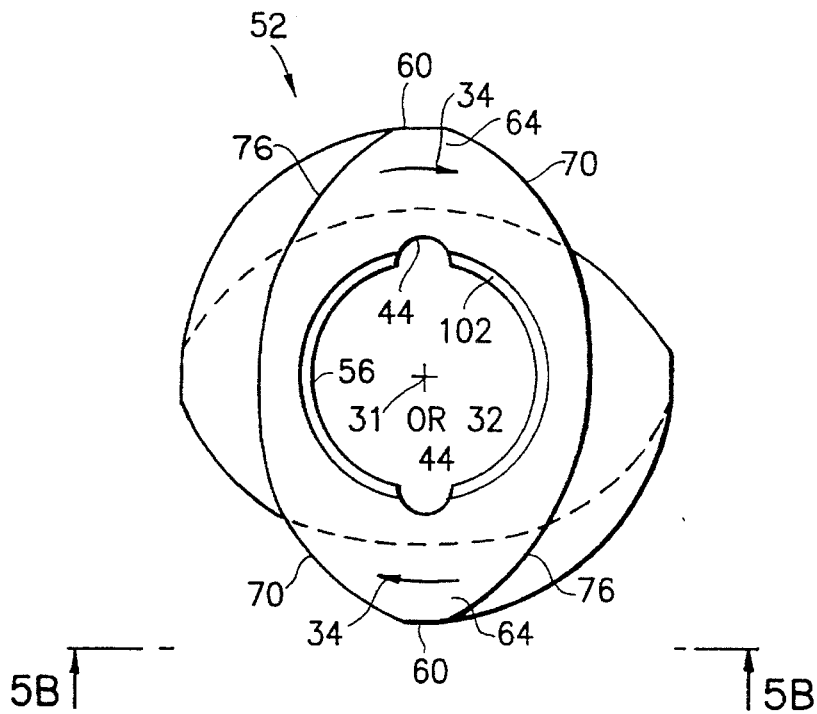
Figure 5B:
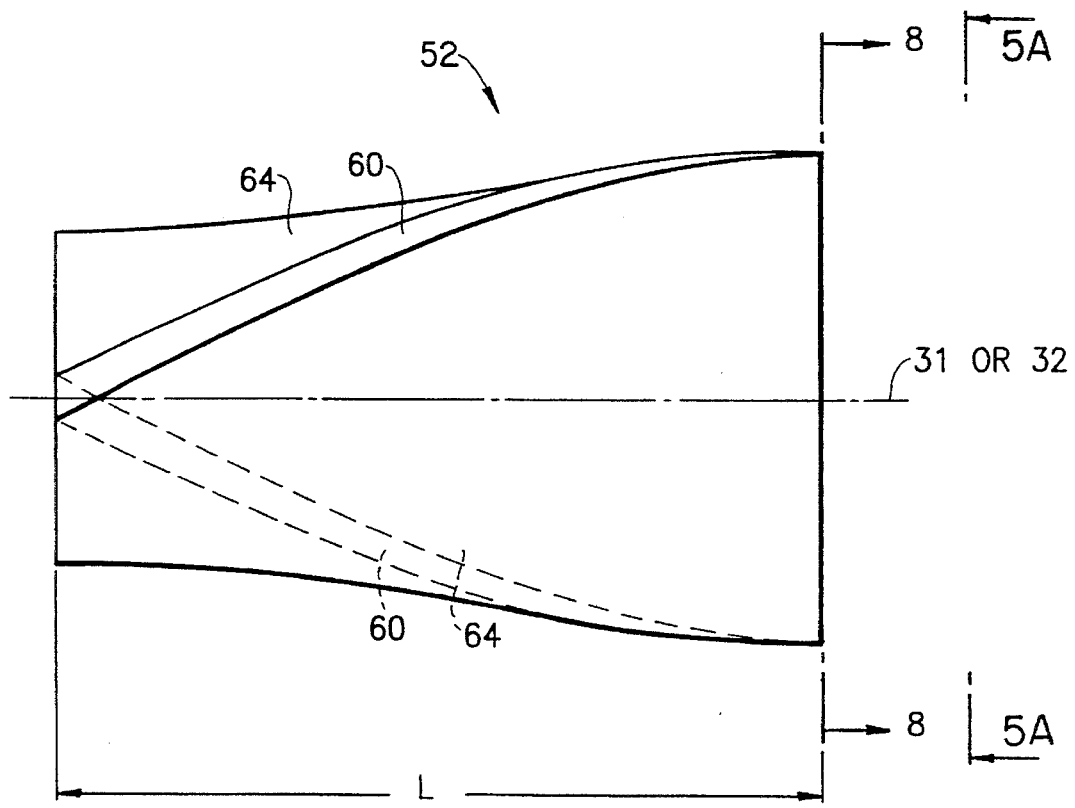

FIGS. 5A and 5B are end elevational and side elevational views, respectively, of another non-symmetrical modular mixing element similar to that shown in FIGS. 4A and 4B, except that the two axially-extending wings each have a left-hand ("LH") twist. An LH twist is a reverse-pumping twist, which may also be referred to as an upstream-pumping twist. FIG. 5A is an end view of the mixing element in FIG. 5B as seen looking upstream, as shown by arrows 5A—5A. FIG. 5B is a side view of the mixing element in FIG. 5A, as indicated by arrows 5B—5B.

Figure 6A:
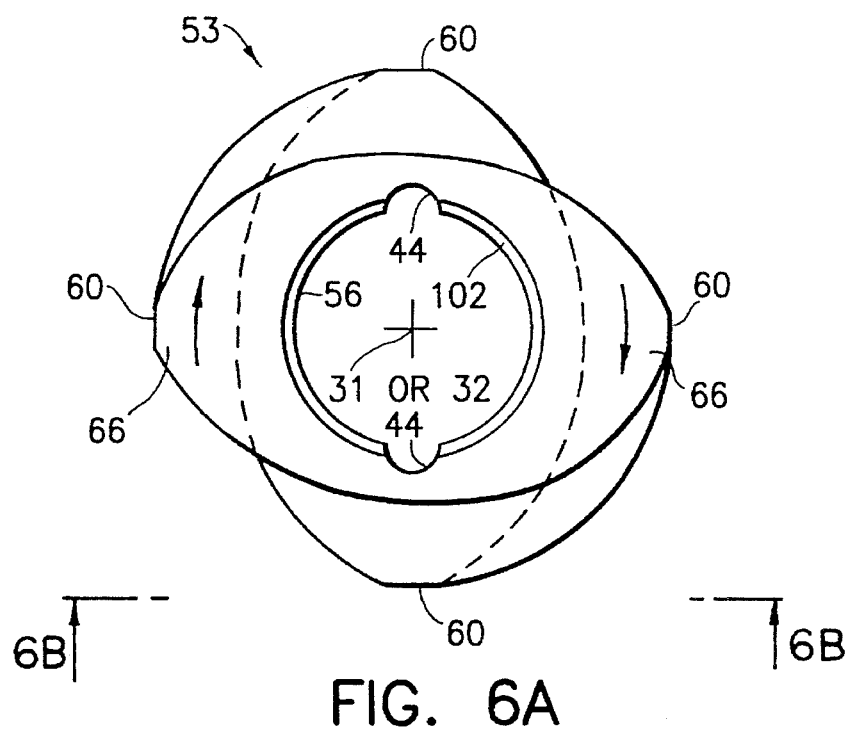
Figure 6B:
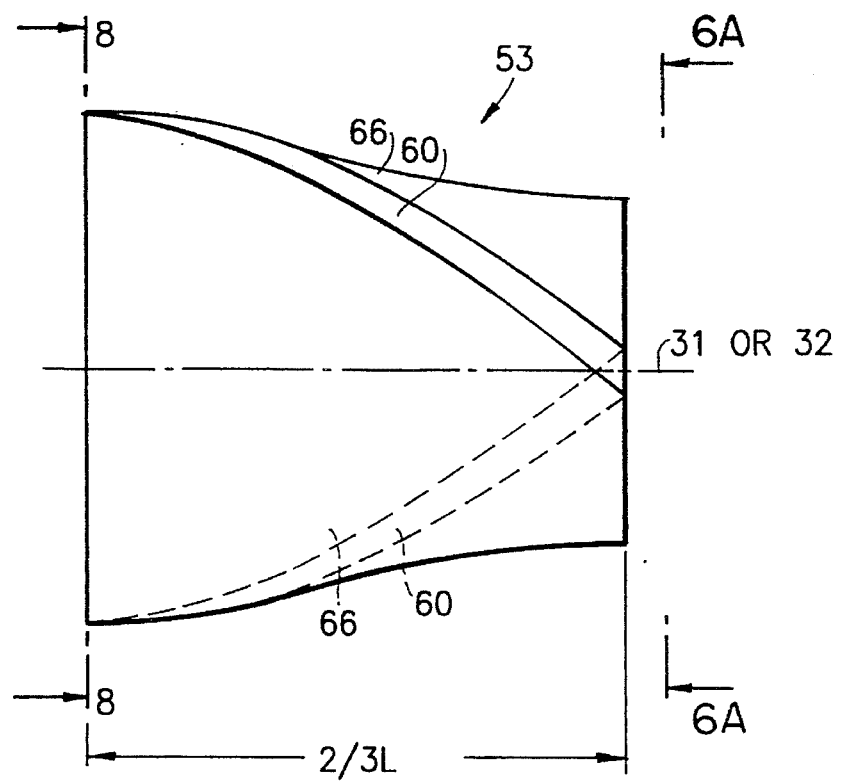

FIGS. 6A and 6B are end elevational and side elevational views, respectively, of an RH-twist non-symmetrical modular mixing element like that shown in FIGS. 4A and 4B, expect that the element shown in FIGS. 6 has two-thirds of the axial length of the element shown in FIGS. 4. FIG. 6A is an end view of the element in FIG. 6B as seen looking upstream, as indicated by arrows 6A—6A. FIG. 6B is a side view of the element in FIG. 6A, as shown by arrows 6B—6B.

Figure 7A:
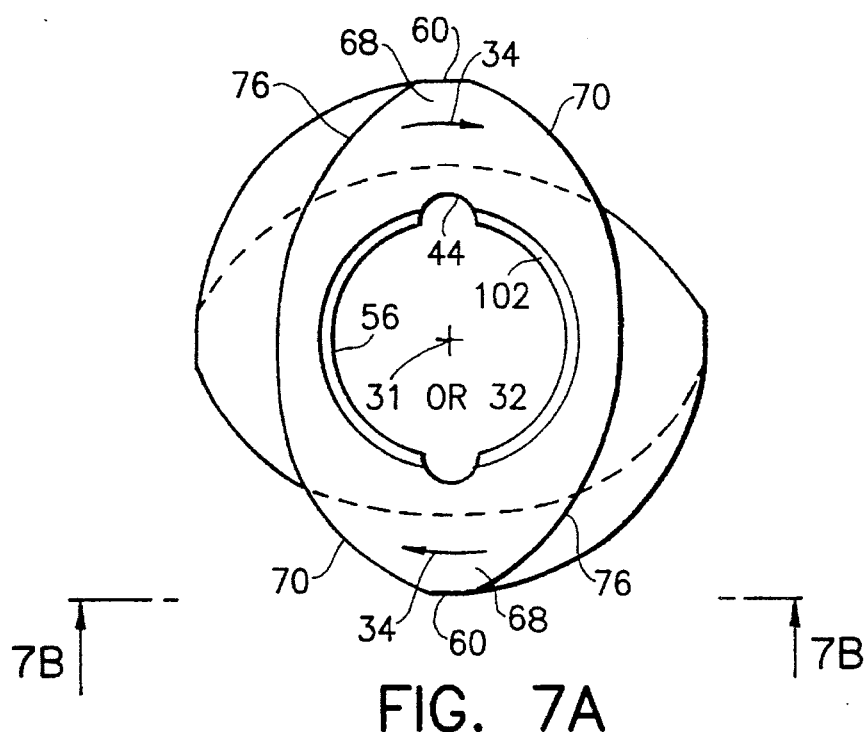
Figure 7B:
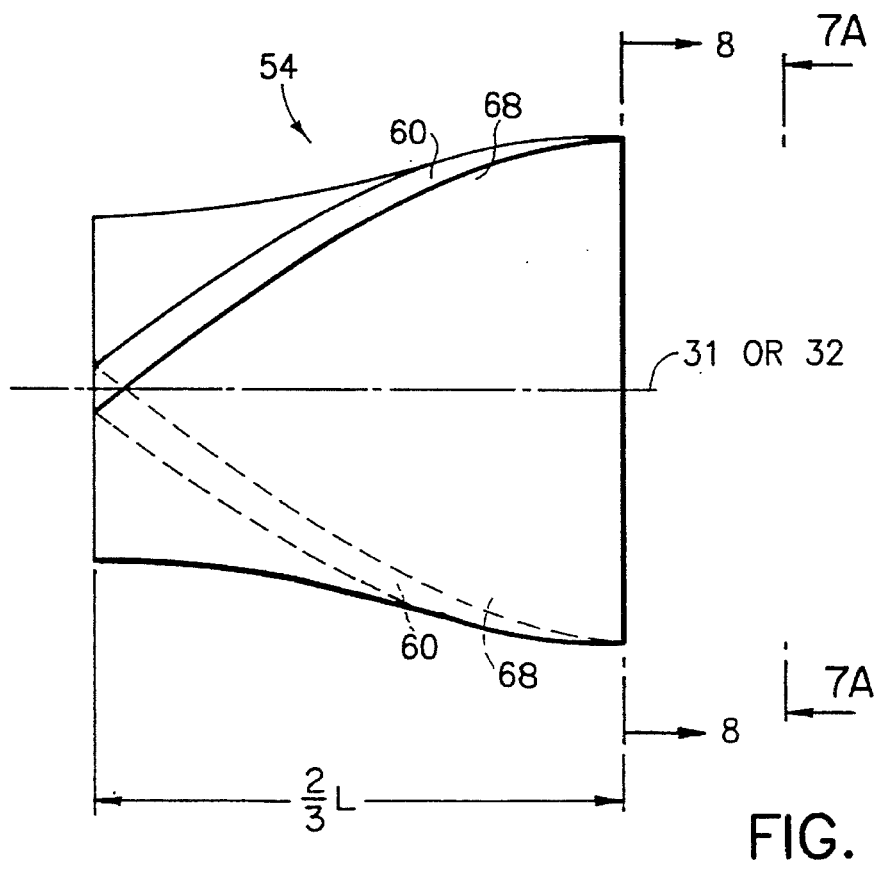

FIGS. 7A and 7B are end elevational and side elevational views, respectively, of an LH-twist non-symmetrical modular mixing element like that shown in FIGS. 5A and 5B, except the element shown in FIGS. 7 has two-thirds of the axial length of the element shown in FIGS. 5. FIG. 7A is an end view of the element in FIG. 7B as seen looking upstream, as indicated by arrows 7A—7A. FIG. 7B is a side view of the element in FIG. 7A, as indicated by arrows 7B—7B.

Figure 8:
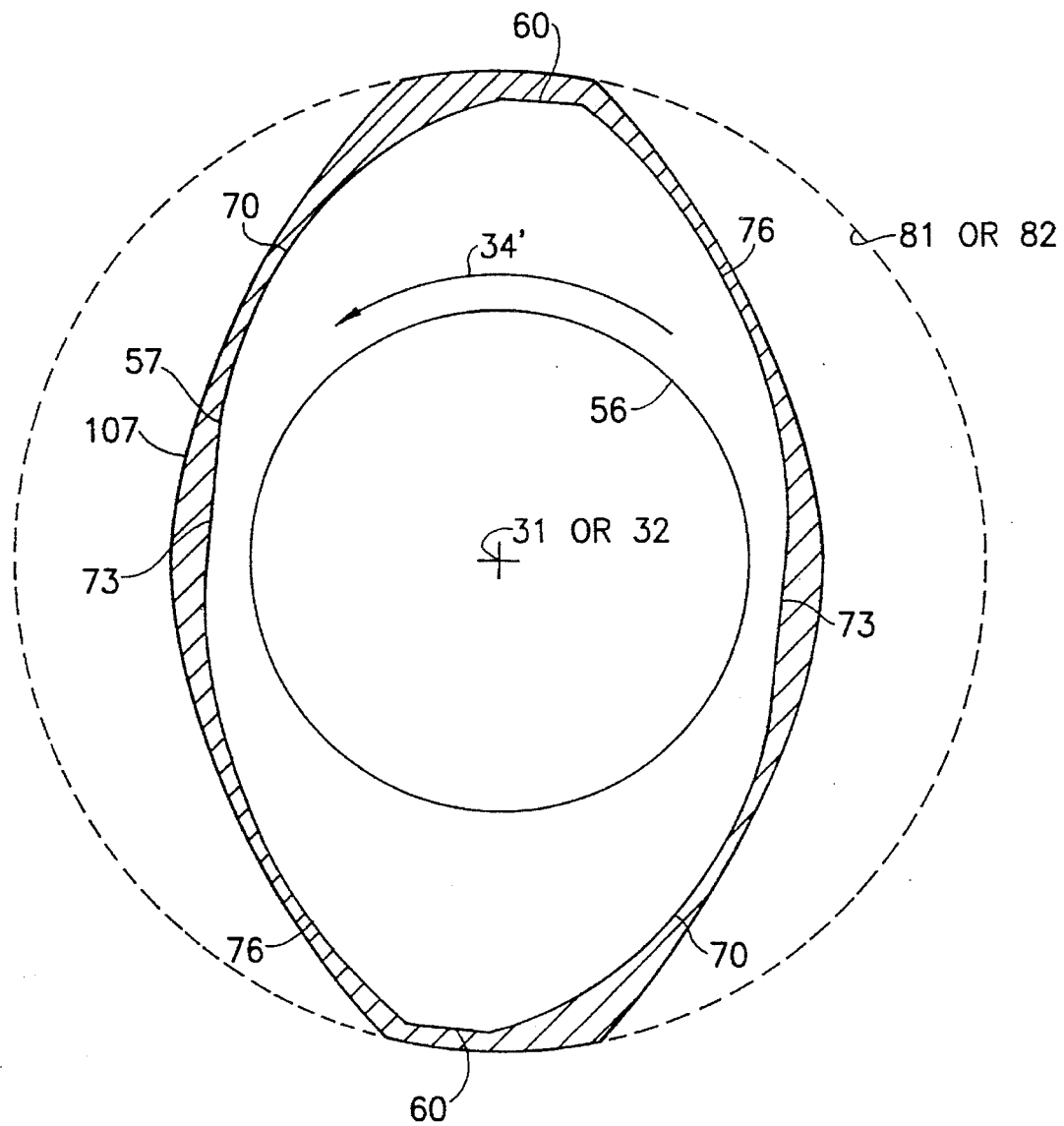

FIG. 8 is a cross-sectional profile view of a non-symmetrical modular mixing element taken along any of the respective planes 8—8 in FIGS. 4B, 5B, 6B or 7B. This profile view of a modular mixing element is shown superimposed upon a twin-screw ideal self-wiping profile (shown shaded). Such a "twin-screw ideal self-wiping profile" is the maximum proportional area of such a profile which can be utilized in a co-rotating, intermeshing twin-screw extruder wherein the screw is continuously in contact with its co-rotating twin and also is continuously in contact with the inner surface of a cylindrical-shaped barrel wall of an extruder housing. The comparison of profiles in FIG. 8 serves to emphasize the relatively large clearances provided around these non-symmetrical modular mixing elements.

DESCRIPTION OF THE PREFERRED EMBODIMENTS

FIGS. 1, 2, 3 and 3A show a multi-screw extrusion-compounding machine 20 having twin intermeshing co-rotating screws 21 and 22. Since FIG. 1 is a side elevational sectional view, only one of the screws 21 is seen. A downstream direction through the machine 20 is shown by an arrow 23. In machine 20, a housing 24 for the screws 21 and 22 comprises a plurality of barrel segments 26-1 through 26-9 inclusive which are removably interconnected in axially aligned positions by suitable disconnectable fastening means as known in the art.

The first barrel segment 26-1 is shown having an inlet opening 25 for infeed into the housing of suitable materials indicated by arrow 27 to be processed. At the upstream end of the housing 24, as seen at the left in FIG. 1, a suitable drive mechanism 28 is shown with mechanical connections indicated by dashed line 29 to respective round shafts 30 (FIG. 2) of the screws 21 and 22 for rotating both screws at the same speed in the same direction. Such a drive mechanism 28 and mechanical connections 29 with suitable thrust bearings are known in the art. For example, the direction of rotation of screws 21 and 22 around their respective axes 31 and 32 may be counterclockwise, as is indicated by arrows 34' as seen looking in downstream direction 23 along the screw axes 31 and 32. It is noted that counterclockwise rotation shown by arrows 34' as seen when looking downstream along these axes 31 and 32 is the same direction of rotation as clockwise rotation shown by arrows 34 as seen when looking upstream along these screw axes.

The seventh barrel segment 26-7 is shown having a vent port 36 for releasing volatiles indicated by an arrow 37. The ninth barrel segment 26-9 at a downstream end of the housing 24 defines the outlet mouth 38 of the housing from which issues a compounded extrudate indicated by arrow 39. A downstream tip end 33 of the shaft 30 of the screw 21 is seen at the right in FIG. 1. It is understood that a suitable die (not shown) normally is mounted to the outlet mouth 38, and the extrudate 39 exits from the machine 20 through such a die.

Each round screw shaft 30 includes one or more keyways 40 (FIG. 2) extending longitudinally of the respective shaft parallel with the respective axis 31 or 32 for receiving keys 42 engaging in corresponding keyways 44 in the elements mounted on the shaft for providing a positive rotational drive connection between each round screw shaft 30 and the elements removably mounted thereon. In the region of the inlet opening 25 (FIG. 1), each screw 21 and 22 includes a plurality of intermeshing co-rotating transport screw elements 45 and 46 mounted end-to-end on and keyed to their respective shafts. It is noted that the transport screw elements 46 are longer than screw elements 45, and the helical screw flights 49 of elements 46 have a proportionately longer lead than the helical screw flights 47 of elements 45 for rapidly transporting infed materials 27 downstream away from the inlet 25. Each of the transport screw elements 45 and 46 is shown having two helical screw flights 47 or 49, respectively. Each such flight extends around its respective screw axis 31 or 32 for one complete turn, i.e. 360°.

Since the helical screw flights 47 on each transport element 45 has a one-turn configuration, the result is to provide uninterrupted helical screw flights extending for the full axial length of all of the contiguous assembled transport elements 45 and 46 when these transport elements are mounted sequentially on and keyed to the respective screw shaft 30 in end-to-end relationship as shown in FIG. 1.

The infed materials 27 include suitable plastic material and suitable additives to be compounded and mixed in the machine 20. Transport screw elements 45 and 46 in the respective screws 21 and 22 convey these materials to be processed to a first set 50-1 of modular mixing elements 51 and 52 mounted end-to-end on their respective shafts 30. Such a mixing set 50-1 as shown includes an RH-twist non-symmetrical modular mixing element 51 contiguous with and positioned immediately upstream from an LH-twist non-symmetrical modular mixing element 52. It is noted, as seen most clearly in FIG. 1A, that the two helical screw flights 47 of the transport screw element 45 which is positioned immediately upstream of the modular mixing element 51 are aligned with respective wing tips 60 (FIGS. 2, 4A and 4B) of wings 62 (FIGS. 2, 4A and 4B) of this mixing element 51. Thus, the two wing tips 60 of the mixing element 51 effectively form downstream continuations of the two helical screw flights 47, but the helix angle and lead of the wing tips 60 are different from the helix angle and lead of the screw flights 47. In other words, there is a sharp change (decrease) in helical twist at the junctures where the respective helical screw flights 47 are met by the respective wing tips 60.

Downstream from the first mixing set 50-1 in the respective screw 21 or 22 is another mixing set 50-2 (FIG. 1B) shown comprising non-symmetrical modular mixing elements 53 and 54 (FIGS. 6A, 6B and 7A, 7B, respectively). Between the mixing sets 50-1 and 50-2 is a plurality of contiguous, sequentially-assembled transport screw elements 45 mounted on and keyed to the respective shaft 30. Four of the elements 45 are shown, plus a short screw transport element 48 wherein its two helical screw flights 47 each extend around its respective axis 31 or 32 for one-half of a complete turn, i.e. 180°. It is noted, as seen most clearly in FIG. 1A, that the two helical flights 47 of the transport screw element 45 positioned immediately downstream of the modular mixing element 52 are aligned with wing tips 60 of two wings 64 (5A and 5B) of this mixing element 52. Thus, the two helical screw flights 47 of this downstream contiguous transport element 45 effectively form downstream continuations of the wing tips 60 of wings 64 of mixing element 52, but there is a sharp reversal in helical twist at the juncture of these respective downstream-transporting helical screw flights 47 and the tips 60 of upstream-pumping wings 64.

The two flights 47 of the short screw transport element 48 are aligned with the wing tips 60 of wings 66 (FIGS. 2, 6A and 6B) of modular mixing element 53 so that these wing tips effectively form downstream continuations of these screw flights 47, but there is a sharp change (decrease) in helical twist at the junctures between these screw flights and the contiguous downstream wing tips 60.

Between the second mixing set 50-2 and the extruder outlet 38 is a final sequence of screw transport elements comprising in sequence: two screw elements 45, two longer screw elements 46 with flights 49 of lower helical pitch and longer lead located near the vent 36 and seven more screw elements 45. This final sequence of seven screw elements 45 serves for building pressure to expel the extrudate 39 through a die (not shown) at the outlet mouth 38. The longer screw elements 46 with their longer lead normally provide increased speed of downstream conveyance for preventing complete filling of the barrels near vent 36 for facilitating release of volatiles 37. It is noted that each shaft end 33 includes suitable fastening means for example such as a retainer nut, with a washer, threaded onto the shaft end for capturing and holding the string of assembled elements 45, 46, 51, 52, 45, 48, 53, 54, 45, 46 and 45 mounted on their respective shafts 30 for forming the screws 21 and 22.

In each screw 21 and 22, the two flights 47 of the transport element 45 positioned immediately downstream from the modular mixing element 54 of the second mixing set 50-2, as seen more clearly in FIG. 1B, are aligned with the tips 60 of wings 68 (FIGS. 7A and 7B) of this mixing element effectively forming downstream continuations of the wing tips 60 of wings 68. There is a sharp reversal in helical twist at the juncture where each downstream-transporting screw flight 47 meets each upstream-pumping wing tip 60 of the modular mixing element 54.

In order to describe features of the various non-symmetrical modular mixing elements 51, 52, 53 and 54, it is helpful to use certain defined terms as explained below. As used herein the following terms, dimensions, factors and ratios are intended to have the respective meanings as follows:

"horizontal", "vertical", "top", "bottom", "up", "down", "upwardly" and "downwardly" are terms used for convenience and clarity in describing components, elements, parts or directions as seen or shown with reference to various FIGURES of the drawings, assuming that the respective drawings are positioned in their normal upright orientations. It is to be understood that these terms are not intended to be limiting since, during operation of the machine 20, the components, elements, parts or directions in the machine may move or rotate into different orientations or angular positions from those as shown in the drawing.

"material" is intended to include both singular and plural for convenience in avoiding usage of "material(s)".

"plastic material" is intended to include any suitable plastic material or materials which may include any suitable additives for compounding in the extrusion-compounding machine 20.

"keyway", "key" and "keyed" are intended to be interpreted sufficiently broadly to include other equivalent means, for example, such as a spline, for providing a positive rotational drive relationship between a rotationally-driven shaft and a transport screw element or a non-symmetrical modular mixing element removably mounted on such shaft and being rotationally driven by the shaft.

The reference symbols listed below have the respective meanings as listed beside these symbols:

D internal diameter (ID) of a barrel wall, which also may be referred to as the barrel bore diameter or barrel inner diameter $\delta$ tip clearance e tip width in circumferential direction in FIGS. 3, 3A and 3B $\phi$ angular tip width $\phi_1$ leading side angular tip width in circumferential direction $\phi_2$ trailing side angular tip width in circumferential direction $R_g$ barrel inner radius $R_0$ tip radius $X_0$ base half-width $R_1$ leading face radius $x_1$ leading face center point coordinate, normal to wing $y_1$ leading face center point coordinate, normal to base $\alpha$ leading face wedge angle $R_2$ trailing face radius $x_2$ trailing face center point coordinate, normal to wing $y_2$ trailing face center point coordinate, normal to base $\beta$ trailing face wedge angle.

All linear distances in the equations set forth further below refer to the barrel inner radius $R_B$. The following ratios are defined:

a=e/δ tip clearance aspect ratio
b=$x_0/R_0$ wing aspect ratio
ε=$\phi_1/\phi$ tip symmetry coefficient.

There are 18 dimensionless geometric variables: 12 distance ratios, 5 angles, and 1 angle ratio. The following 6 variables are considered the principal or independent design variables, which may be selected for any particular non-symmetrical modular mixing element: $\delta/R_B$, a, b, ε, α, β. The other twelve variables are considered dependent variables, computed by solving simultaneously the twelve equations set forth below. It is noted that "atan" is a computer abbreviation for "arctan":

$$\left(\frac{x_1}{R_B}\right)^2 + \left(\frac{y_1}{R_B}\right)^2 = \left(\frac{R_0}{R_B}\right)^2 + \left(\frac{R_1}{R_B}\right)^2 - 2\left(\frac{R_0}{R_B}\right)\left(\frac{R_1}{R_B}\right)\cos\alpha \quad (1)$$

$$\left(\frac{R_1}{R_B}\right)\sin\alpha = \sqrt{\left(\frac{x_1}{R_B}\right)^2 + \left(\frac{y_1}{R_B}\right)^2} \sin\left(\phi_1 + atan\left(\frac{x_1}{y_1}\right)\right) \quad (2)$$

$$\left(\frac{x_2}{R_B}\right)^2 + \left(\frac{y_2}{R_B}\right)^2 = \left(\frac{R_0}{R_B}\right)^2 + \left(\frac{R_2}{R_B}\right)^2 - 2\left(\frac{R_0}{R_B}\right)\left(\frac{R_2}{R_B}\right)\cos\beta \quad (3)$$

$$\left(\frac{R_2}{R_B}\right)\sin\beta = \sqrt{\left(\frac{x_2}{R_B}\right)^2 + \left(\frac{y_2}{R_B}\right)^2} \sin\left(\phi_2 + atan\left(\frac{x_2}{y_2}\right)\right) \quad (4)$$

$$\frac{R_1}{R_B} - \frac{x_1}{R_B} = \frac{x_0}{R_B} \quad (5)$$

$$\frac{R_2}{R_B} - \frac{x_2}{R_B} = \frac{x_0}{R_B} \quad (6)$$

$$\frac{e}{R_B} = a \frac{\delta}{R_B} \quad (7)$$

$$\frac{x_0}{R_B} = b \frac{R_0}{R_B} \quad (8)$$

$$\frac{e}{R_B} = \phi \frac{R_0}{R_B} \quad (9)$$

$$\phi_1 = \frac{\epsilon\phi}{1+\epsilon} \quad (10)$$

$$\phi_2 = \frac{\phi}{1+\epsilon} \quad (11)$$

$$\frac{\delta}{R_B} = 1 - \frac{R_0}{R_B} \quad (12)$$

Once ranges are selected for the six independent variables, then resultant ranges for the dependent variables can be computed. It should be noted that the six independent variables cannot be selected arbitrarily but are constrained by parameters, such as $\phi \geq 0$, etc., which result in a series of complex bounds for all of them. Further, in accordance with the present invention, there are preferred, more preferred and most preferred ranges for the six independent variables, as will be explained later, for enhancing the processing characteristics of extrusion-compounding machines in handling various plastic materials and additives being compounded.

With further reference to FIG. 2, the housing assembly 24 is shown including two adjoining barrel sections 83 and 84 having respective substantially cylindrical inside wall surfaces 81 and 82 (barrel inner surfaces) which intersect. These cylindrical surfaces 81 and 82, as seen in cross-section in FIG. 2, appear as two intersecting circles in the form of a figure eight.

Each non-symmetrical modular mixing element 51, 52, 53 or 54 has an axial bore 56 for mounting on a shaft 30. The transport screw elements 45, 46 and 48 have bores and keyways (not shown) similar to those shown in FIG. 2 for the modular mixing elements.

Shown most clearly in FIGS. 3, 3A and 3B is a profile 57 of a non-symmetrical modular mixing element 51, 52, 53 or 54. Each modular mixing element 51, 52, 53, or 54 is shown in FIG. 3 having two non-symmetrical wings 62, 64, 66, or 68, respectively. Also in FIG. 3 is shown the diameter D of the inside cylindrical surface 81 or 82 of a barrel section 83 or 84, respectively, in the housing assembly 24. The dimensions of various components of a mixing element may be expressed later in terms of this barrel inner diameter D so that these dimensions are set forth in universal terms relative to D for being applicable to extrusion-compounding machines of various sizes, or alternatively such dimensions may be expressed in terms of the barrel inner radius $R_B$ for similar reasons to be set forth in universal terms.

Each of the wings 62, 64, 66 or 68 includes a convex leading face 70 of radius $R_1$ which meets the surface of the wing tip 60 along a corner 71. This convex leading face 70 merges at a point 72 with a straight tangent portion 73 (called a "FLAT") of the non-symmetrical profile 57. As shown in FIG. 3A, this merging tangent point 72 is located above the base line X by the same distance as the coordinate distance $y_1$ at which the leading face center point 74 is located above this base line. The pair of base half-widths $X_0$ lie along the base line X on opposite sides of the axis 31 or 32.

Each of the wings 62, 64, 66 or 68 includes a convex trailing face 76 of radius $R_2$ which meets the surface of wing tip 60 along a corner 77. Trailing face radius $R_2$ is preferred to be always larger than leading face radius $R_1$ for reasons explained later. A center point 78 for the trailing face radius $R_2$ is spaced a small coordinate distance $y_2$ above base line X. The coordinate distance $x_1$ for leading face center point 74 and the coordinate distance $x_2$ for trailing face center point 78 are measured normal to a center-line 75 (major chord) of the two non-symmetrical wings 62, 64, 66 or 68 of each modular mixing element 51, 52, 53 or 54. This center-line major chord 75 is called a "center-line" because it extends through the axis 31 or 32. The coordinate $x_2$ is always larger than $x_1$, and the coordinate $y_2$ is always smaller than $y_1$. Since the trailing face center point 78 is spaced slightly above the base line X, it is noted that the flat 73 extends a slight distance beyond the base line X and merges at a merging tangent point 79 with the convex trailing face 76.

In order to explain an advantageous wedge angle α between the convex leading face 70 of a non-symmetrical wing 62, 64, 66 or 68 and the barrel inner wall surface 81 or 82, reference will now be made to FIG. 3B. A second radius $R_1$ is being called out. This second radius $R_1$ is a line segment 86 extending from the leading face center point 74 to the corner 71 where the profile 57 of the leading face 70 intersects with the surface of the wing tip 60. Since this line segment 86 extending from point 74 to corner 71 is a radius of the arcuate leading face 70, it is normal (perpendicular) at point 71 to a tangent to this convex leading face 70 at point 71. A line 90 is indicated extending from the axis 31 or 32 to the corner 71, and this line 90 is shown by a dash 91 being extended out to a point 92 on the barrel inner surface 81 or 82. Since this extended line 90, 91 radiates from the axis 31 or 32 (which is the axis of the barrel inner surface and is also the axis of the screw assembly 21 or 22), this extended line 90, 91 is a radius of the barrel inner surface and hence is perpendicular at point 92 to a tangent to the barrel inner surface at point 92.

A dashed line 93 is drawn tangent to the leading face 70 at the corner point 71. Another dashed line 94 is drawn tangent to the barrel inner surface 81 or 82 at the point 92. The angle α between tangent lines 93 and 94 is called the leading face wedge angle because it provides an essentially constant and uniform wedging action commencing near the flat-to-curve merge point 72 and continuing to the wing-tip-leading-corner 71. Since they are perpendicular to the respective tangents 93 and 94, the line segment 86 and line 90 also define between themselves this same leading face wedge angle α, as shown in FIG. 3B. By a geometric principle, it is noted that lines 86 and 90, which are respectively perpendicular to two intersecting lines (tangents 93 and 94), define between themselves the same angle as between the intersecting lines.

By similar reasoning, it is seen that a line segment 87 extending from trailing face center point 78 to the wing-tip-trailing-corner 77 is another radius $R_2$ of the arcuate trailing face 76. Hence, line 87 is perpendicular to a tangent 95 (shown dashed) to trailing face curve 76 at the corner point 77. A line segment 96 radiating from axis 31 or 32 to the corner point 77 is extended as shown by dash 97 to a point 98 on the barrel inner surface 81 or 82. Thus, a tangent 99 (shown dashed) to the barrel inner surface 81 or 82 at point 98 is perpendicular to line 96, 97. The angle β between tangents 95 and 97 is called the trailing face wedge angle and is always larger than the leading face wedge angle α. Lines 87 and 96 also define between themselves the same angle β as do the tangents 95 and 99 due to the same geometric principle as noted above for the angle α.

By the dynamic wedging action created by wedge angle α in wedge zone 85 (FIG. 3B) between leading face 70 and barrel inner surface 81 or 82, the plastic material 27 (FIG. 1) being compounded is subjected to dynamic wedging pressurization in this zone 85 which propels relatively large circumferential flows of this material, as shown by arrow 88, through the relatively large shear clearance δ at the wing tip 60. Thus, large circumferential flows 88 of plastic material are driven repeatedly by dynamic wedging pressurization action so as to pass repeatedly through the large shear clearances δ. Due to these relatively large shear clearances, the plastic material is being mixed at lower and more uniform temperatures than usually occurs with use of typical prior art kneading elements. Since viscosity in most plastic materials diminishes with elevating temperatures, the lower temperatures which are achieved enable the plastic material to be processed at higher viscosities than typically occurs in prior extrusion-compounding machines. Due to the higher viscosities of the lower-temperature plastic material, shear stresses in the material are higher, thus enhancing dispersive mixing in spite of the relatively large clearances δ which are being utilized.

Also, due to the fact that the trailing face wedge angle β is chosen to be larger than the leading face wedge angle, the plastic material experiences a sudden release, i.e. a reduction in circumferential flow rate and in shear rate, after it has passed the trailing wing tip corner 77. This sudden release of the plastic material in a trailing wedge release zone 89 following passage of the corner 77 causes in effect a detachment of the plastic from the barrel inner surface 81 or 82, almost as though the plastic material were "rebounding" away from this inner surface. Consequently, less energy is needlessly imparted in this trailing wedge angle zone 89, thereby conserving energy and keeping the plastic material at a lower temperature than occurs with symmetric kneading blocks or kneading discs.

A sequence of seven experimental tests was run on polypropylene material having a Melt Flow Index (MFI) of 2.5 as measured in accord with ASTM testing procedure D1238 (conditions 230° C. (446° F.) with piston weight of 2.16 kilograms). The extrusion-compounding machine as run included screw assemblies 21 and 22 arranged as shown in FIGS. 1, 1A, 1B, 2, 3, 3A and 3B. The results of these seven experimental tests are summarized in Columns 1 through 7 of Table I, set forth below. "SEI" is the specific energy input, which is the calculated result of dividing measured energy input by the resultant mass flow rate in pounds per hour. The temperatures of the eight successive barrel segments 26-2 through 26-9 were measured by suitable temperature sensors, one of which is indicated by T with the sensor 100 shown inserted in barrel segment 26-6 so as to be responsive to temperature of the respective barrel segment. The exit temperature and pressure are, respectively, the temperature of the extrudate 39 and the pressure at which it was being extruded through the die. The head temperature is the temperature of the exit head at the downstream end of the final barrel segment 26-9. The die temperature is the temperature of the die (not shown) through which the extrudate 39 was expelled.

There are two temperatures set forth in each test column for eight Barrel segments and the Head. The left temperature value in each column is the set point (or target), and the right value is the temperature actually obtained as shown by the respective measured temperatures. It is noted that relatively low and relatively uniform temperatures were achieved along the full length of the barrel in all of the seven test runs.

TABLE I

| | Material: PP MFI = 2.5 | | | | | | | | | | | | | |
|---|---|---|---|---|---|---|---|---|---|---|---|---|---|---|
| Run | 1 | | 2 | | 3 | | 4 | | 5 | | 6 | | 7 | |
| Rate (lb/hr) | 680 | | 680 | | 740 | | 830 | | 830 | | 830 | | 830 | |
| Speed (rpm) | 350 | | 350 | | 350 | | 350 | | 350 | | 350 | | 350 | |
| SEI (hp-hr/lb) | 0.193 | | 0.100 | | 0.095 | | 0.085 | | 0.085 | | 0.082 | | 0.079 | |
| Barrel T1 (°F.) | 400 | 395 | 400 | 395 | 400 | 395 | 400 | 395 | 400 | 400 | 400 | 395 | 400 | 395 |
| Barrel T2 (°F.) | 400 | 410 | 400 | 405 | 400 | 410 | 400 | 405 | 400 | 405 | 400 | 405 | 400 | 405 |
| Barrel T3 (°F.) | 400 | 405 | 400 | 405 | 400 | 405 | 400 | 400 | 400 | 400 | 400 | 400 | 400 | 400 |

TABLE I-continued

Material: PP MFI = 2.5

| Run | 1 | | 2 | | 3 | | 4 | | 5 | | 6 | | 7 | |
|---|---|---|---|---|---|---|---|---|---|---|---|---|---|---|
| Barrel T4 (°F.) | 400 | 390 | 400 | 390 | 400 | 390 | 400 | 390 | 400 | 390 | 400 | 390 | 400 | 395 |
| Barrel T5 (°F.) | 400 | 400 | 350 | 380 | 350 | 390 | 350 | 365 | 300 | 355 | 400 | 395 | 400 | 400 |
| Barrel T6 (°F.) | 400 | 395 | 350 | 325 | 350 | 325 | 350 | 325 | 300 | 275 | 400 | 365 | 400 | 360 |
| Barrel T7 (°F.) | 400 | 395 | 350 | 320 | 350 | 300 | 350 | 325 | 300 | 270 | 400 | 295 | 400 | 330 |
| Barrel T8 (°F.) | 400 | 395 | 350 | 330 | 350 | 335 | 350 | 350 | 300 | 280 | 400 | 390 | 400 | 395 |
| Head Temp. (°F.) | 400 | 400 | 400 | 395 | 400 | 395 | 400 | 395 | 400 | 395 | 400 | 395 | 400 | 400 |
| Die Temp. (°F.) | 330 | | 330 | | 330 | | 330 | | 330 | | 330 | | 330 | |
| Exit Temp. (°F.) | 435 | | 400 | | 400 | | 390 | | 410 | | 395 | | 415 | |
| Exit Press. (psig) | 830 | | 880 | | 820 | | 750 | | 830 | | 760 | | 740 | |

FIGS. 4A and 4B show end elevational and side elevational views of the non-symmetrical modular mixing element 51, which was described with reference to FIGS. 1 and 1A. It is shown with two wings 62 located in diametrically opposite angular positions relative to the screw axis 31 or 32. The wings 62 with their wing tips 60 are shown having an RH-twist of 90° within the axial length L of the element 51. As will be appreciated from a close look at FIG. 1A, which shows a barrel segment 26-3, the axial length L is shown as being one-half of the axial length of a barrel segment. With two opposed keyways 44 as shown and with a 90° twist, such elements 51 are enabled to be assembled in multiple sets and combinations with their wing tips 60 being in alignment for forming an uninterrupted helix at their end-to-end junctures.

FIGS. 5A and 5B show end elevational and side elevational views of the non-symmetrical modular mixing element 52, which was described with reference to FIGS. 1 and 1A. This mixing element 52 is shown with two wings 64 located in diametrically opposite angular positions relative to the screw axis 31 or 32. The wings 64 with their wing tips 60 are shown having an LH-twist of 90° within the axial length L (one-half of the axial length of a barrel segment). With two opposed keyways 44 as shown and with a 90° twist, such elements 52 are enabled to be assembled in multiple sets and combinations with their wing tips 60 being aligned end-to-end for forming an uninterrupted helix. Also, elements 51 and 52 can be assembled in sets 50-1 (FIGS. 1 and 1A) as described. Their wing tips are aligned at a juncture 104 (FIG. 1A), but there is an abrupt reversal in twist forming a cusp at this juncture 104.

FIGS. 6A and 6B show end elevational and side elevational views of the non-symmetrical modular mixing element 53 seen in FIGS. 1 and 1B. Element 53 is shown with two diametrically opposite wings 66. These wings 66 with their wing tips 60 are shown having an RH-twist of 90° within an axial length of two-thirds L. Thus, the length of element 53 is shown as being one-third the length of a barrel segment. With two opposed keyways 44 as shown and with a 90° twist, such elements 53 are enabled to be assembled in multiple sets and combinations with their wing tips being in alignment at their end-to-end junctures for forming an uninterrupted helix. Moreover RH-twist mixing elements 51 and 53 are enabled to be assembled with their wing tips in alignment for providing changes in RH helical pitch at their junctures. RH-twist mixing elements 51 and 53 are enabled to be assembled upstream of LH-twist mixing elements 52 with wing tips in alignment but there is an abrupt reversal in twist forming a cusp at their junctures.

FIGS. 7A and 7B show end elevational and side elevational views of non-symmetrical LH-twist modular mixing element 54 of 90° twist. This mixing element 54 is seen also in FIGS. 1 and 1B. It has an axial length of two-thirds L and is similar to the mixing element 53, except that their helical twists are of equal pitch but opposite senses. Thus, mounted end-to-end in a set of 50-2 as shown in FIG. 1B they form a cusp 106 which has a steeper V-shape than cusp 104 (FIG. 1A) since their axial lengths are shorter, thereby creating a larger helix angle (shorter lead) in their wing tips 60 than the helix angle for the wing tips 60 of the longer mixing elements 51 and 52.

In FIG. 8 the profile 57 of a non-symmetrical modular mixing element is shown superimposed upon a twin-screw ideal self-wiping profile 107 (shown shaded). As explained earlier, such a twin-screw ideal self-wiping profile is the maximum proportional area of such a self-wiping profile which can be utilized in a co-rotating, intermeshing twin-screw extruder in which the screw remains continuously in wiping contact with its co-rotating twin and also remains continuously in wiping contact with a cylindrical-shaped barrel inner wall surface 81 or 82. The substantial proportional amount of the shaded area between profiles 107 and 57 shows the relatively large clearances provided around the non-symmetrical profiles 57 of these modular mixing elements.

In operation of the machine 20, the downstream flow is primarily channel flow in regions along a barrel where the transport screw elements 45, 46 or 48 are intermeshing. This channel flow occurs along the helical valleys between successive screw flights 47. In distinction to this channel flow, are the relatively large amounts of circumferential flow produced in regions along a barrel where sets of non-symmetrical modular mixing elements 51, 52, 53 or 54 are mounted. By their dynamic wedging action and their relatively large shear clearances they produce relatively large proportional amounts of circumferential flow as is shown by arrows 88 in FIG. 3B. It is recognized that the entire mass of plastic material in the barrel is progressing downstream, but nevertheless the non-symmetrical configurations as shown and described produce relatively large proportional amounts of circumferential flow 88 thereby producing repeated passes of the material through the relatively large tip clearances δ for efficiently and effectively producing homogeneous compounding of the plastic material.

Our analysis leads us to select the following preferred ranges for the independent design variables which were discussed above for the non-symmetrical profile 57:

TABLE II ratio of tip clearance $\delta$ to barrel inner radius $R_B$=about 0.01 to about 0.15 tip clearance aspect ratio a=about 1 to about 8 wing aspect ratio b=about 0.5 to about 0.8 tip symmetry coefficient $\epsilon$=about 0 to about 1 leading face wedge angle $\alpha$=about 5° to about 25° trailing face wedge angle $\beta$=about 10° to about 90° and $\beta$ is at least about 1° larger than $\alpha$.

Our more preferred ranges for these independent design variables for the non-symmetrical profile 57 are as follows:

TABLE III $\delta/R_B$=about 0.02 to about 0.12 a=about 1.5 to about 6 b=about 0.55 to about 0.75

$\epsilon$=about 0.25 to about 0.75

$\alpha$=about 10° to about 20°

$\beta$=about 20° to about 30°

$\beta$ is at least about 5° larger than $\alpha$.

Our most preferred ranges of values for the independent design variables for the non-symmetrical profile 57 are as follows:

TABLE IV $\delta/R_B$=about 0.03 to about 0.10 a=about 2 to about 5 b=about 0.6 to about 0.7

$\epsilon$=about 0.4 to about 0.6

$\alpha$=about 12° to about 16°

$\beta$=about 22° to about 28°

$\beta$ is at least about 7° larger than $\alpha$.

Inviting attention again to FIGS. 4A and B, 5A and B, 6A and B and 7A and B, the helix angles for the wing tips 60 of modular mixing elements are preferred to be in the range of about 20° to about 60°. The lead of the helical wing tips is preferred to be in the range of about 2D to about 8D.

Also, it is to be noted that the twist of 90° shown for the modular mixing elements 51, 52, 53 and 54 is related to their two-keyway configuration. With a three-keyway configuration, twist angles of 60° are usable for providing alignment of wing tips 60 at end-to-end junctions. With a four-keyway configuration twist angles of either 90° or 45° may be used for providing such alignment of wing tips at junctures, and so forth.

Since other changes and modifications varied to fit particular extrusion-compounding machine operating requirements and environments will be recognized by those skilled in the art, the invention is not considered limited to the examples chosen for purposes of illustration, and includes all changes and modifications in extrusion-compounding machines which do not constitute a departure from the true spirit and scope of this invention as claimed in the following claims and equivalents to the claimed elements.

We claim:

1. A multi-screw extrusion-compounding machine comprising:

a housing assembly including two adjoining and substantially cylindrical barrel sections each having an inner wall surface;

an extrusion-compounding screw disposed within each of said adjoining barrel sections with the screws being axially adjacent each other and rotatable in the same direction about an axis of rotation;

each screw including a plurality of transport screw elements removably mounted on and keyed to a rotationally drivable shaft;

said transport screw elements intermeshing;

each screw including at least one set of non-symmetrical modular mixing elements;

each modular mixing element being removably mounted on and keyed to said shaft;

each modular mixing element having a plurality of non-symmetrical wings;

said modular mixing elements intermeshing; and each set of said non-symmetrical modular mixing elements including at least one modular mixing element having a left-hand-twist mounted immediately downstream and contiguous with at least one modular mixing element having a right-hand twist.

2. An extrusion-compounding machine according to claim 1 wherein:

each wing has a leading face and a trailing face with a wing tip positioned between said leading and trailing faces;

said leading face defines a leading face wedge angle $\alpha$ with said barrel inner wall surface;

said trailing face defines a trailing face wedge angle $\beta$ with said barrel inner wall surface; and said angle $\beta$ is at least about 5° larger than said angle $\alpha$.

3. An extrusion-compounding machine according to claim 2 wherein;

said leading face wedge angle $\alpha$ is in a range of about 5° to about 25°; and said trailing face wedge angle $\beta$ is in a range of about 10° to about 50°.

4. An extrusion-compounding machine according to claim 3 wherein:

said wing tip has a tip clearance $\delta$ from said barrel inner wall surface;

said barrel inner wall surface has a barrel inner radius $R_B$; and the ratio of said tip clearance $\delta$ to said barrel inner radius $R_B$ is about 2 percent to about 15 percent.

5. An extrusion-compounding machine according to claim 4 wherein:

said wing tip has a circumferential extent e;

a tip clearance aspect ratio a is defined as the ratio of said wing tip circumferential extent e to said tip clearance $\delta$; and the tip clearance aspect ratio is in a range of about 1 to about 8.

6. An extrusion-compounding machine according to claim 5 wherein:

said barrel inner wall surface is concentric about said axis of rotation; and said wing tip circumferential extent e is concentric about said axis of rotation; and said tip clearance $\delta$ is constant along said circumferential extent e.

7. An extrusion-compounding machine according to claim 6 wherein:

the aspect ratio of said wing tip circumferential extent e to said tip clearance $\delta$ is in a range of about 1.5 to about 6.

8. An extrusion-compounding machine according to claim 3 wherein:

said wing tip has a tip clearance δ from said barrel inner wall surface;

said barrel inner wall surface has a barrel inner radius $R_B$; and the ratio of said tip clearance δ to said barrel inner radius $R_B$ is about 3 percent to about 14 percent.

9. An extrusion-compounding machine according to claim 8 wherein:

said wing tip has a circumferential extent e;

a tip clearance aspect ratio a is defined as the ratio of said wing tip circumferential extent e to said tip clearance δ; and the tip clearance aspect ratio is about 1.5 to about 6.

10. An extrusion-compounding machine according to claim 2 wherein:

said leading face wedge angle α is in a range of about 12° to about 18°;

said trailing face wedge angle β is in a range of about 20° to about 36°; and said angle β is at least about 6° larger than said angle α.

11. A multi-screw extrusion-compounding machine comprising:

a housing assembly including two adjoining and substantially cylindrical barrel sections each having an inner wall surface;

said inner wall surface having an inner diameter D;

an extrusion-compounding screw disposed within each of said adjoining barrel sections with the screws being axially adjacent each other and rotatable in the same direction about an axis of rotation;

each screw including a plurality of transport screw elements removably mounted on and keyed to a rotationally drivable shaft;

said transport screw elements intermeshing;

each screw including at least one set of non-symmetrical modular mixing elements;

each modular mixing element being removably mounted on and keyed to said shaft;

each modular mixing element having a plurality of axially-extending non-symmetrical wings having an angular twist about said axis of rotation;

said modular mixing elements intermeshing;

each set of said non-symmetrical modular mixing elements including at least one modular mixing element whose wings have a left-hand-twist mounted immediately downstream and contiguous with at least one modular mixing element whose wings have a right-hand twist; and said angular twist of said wings having a lead in the range of about 2D to about 8D.

12. A multi-screw extrusion-compounding machine according to claim 11 wherein:

each of said non-symmetrical modular mixing elements has an axial length;

each of said modular mixing elements has an axial bore with a plurality of keyways therein;

said wings on each modular mixing element have an end-to-end amount of twist around said axis of rotation; and said end-to-end amount of twist is equal to 180° divided by the number of said keyways.

13. A multi-screw extrusion-compounding machine according to claim 11 wherein:

a first plurality of said transport screw elements are removably mounted on and keyed to said shaft disposed upstream from each set of non-symmetrical modular mixing elements;

a second plurality of said transport screw elements are removably mounted on and keyed to said shaft disposed downstream from each set of non-symmetrical modular mixing elements;

downstream ends of screw flights of a transport screw element contiguous with an upstream end of said right-hand-twist modular mixing element in a set are aligned with upstream ends of said wings of said right-hand-twist modular mixing element in said set.

14. A multi-screw extrusion-compounding machine according to claim 13 wherein:

upstream ends of screw flights of a transport screw element contiguous with a downstream end of said left-hand-twist modular mixing element are aligned with downstream ends of said wings of said left-hand-twist modular mixing element.

15. A non-symmetrical modular mixing element for removably mounting on a rotationally-driven screw shaft of an extrusion-compounding machine in keyed relation to said shaft wherein:

said non-symmetrical modular mixing element having an axial bore for receiving said shaft;

said axial bore having at least one keyway;

said non-symmetrical mixing element having a plurality of non-symmetrical wings;

each of said wings having a leading face and a trailing face with a wing tip intermediate said leading and trailing faces; and said leading face having a smaller radius of curvature than said trailing face.

16. A non-symmetrical modular mixing element for removably mounting on a rotationally-driven screw shaft of an extrusion-compounding machine in keyed relation to said shaft wherein:

said non-symmetrical modular mixing element has an axial bore for receiving said shaft and has an axis of rotation concentric with said axial bore;

said axial bore having at least one keyway;

said non-symmetrical modular mixing element being configured for removably mounting on such a screw shaft for installation in an extrusion-compounding machine designed for two intermeshing co-rotating screws to be positioned in respective barrel sections of two adjoining and substantially cylindrical barrel sections each having a barrel surface inner radius $R_B$;

said non-symmetrical modular mixing element having two non-symmetrical wings located on opposite sides of said axis of rotation;

each of said wings having a leading face and a trailing face with a wing tip intermediate said leading and trailing faces;

said leading face having a convex portion adjoining the wing tip;

said convex portion of the leading face having a radius $R_1$ extending from a leading face center point;

a position of said radius $R_1$ extending from said leading face center point to a point on said convex portion of the leading face defining an angle α with a radial line extending from said axis of rotation to said point on said convex portion of the leading face;

said trailing face meeting with the wing tip along a corner;

a geometric straight line extended from said trailing face at said corner and being a straight extension of said trailing face at said corner to a point on the barrel inner surface defining an angle $\beta$ with a tangent to the barrel inner surface at said point; and said angle $\beta$ being larger than said angle $\alpha$.

17. A non-symmetrical modular mixing element as claimed in claim 16, wherein:

said angle $\beta$ is at least about 5° larger than said angle $\alpha$.

18. A non-symmetrical modular mixing element as claimed in claim 17, wherein:

said wing tip is at a radial distance $R_o$ from said axis of rotation; and said non-symmetrical modular mixing element is configured for said radial distance $R_o$ to be less than said barrel surface inner radius $R_B$ by a tip clearance $\delta$ having a ratio of tip clearance $\delta$ to said barrel surface inner radius $R_B$ in a range of about 0.01 to about 0.15.

19. A non-symmetrical modular mixing element as claimed in claim 16, wherein:

said angle $\beta$ is at least about 5° larger than said angle $\alpha$;

said wing tip has a radial distance $R_o$ from said axis of rotation;

said non-symmetrical modular mixing element is configured for said radial distance $R_o$ to be less than said barrel surface inner radius $R_B$ by a tip clearance $\delta$ having a ratio of tip clearance $\delta$ to said barrel surface inner radius $R_B$ in a range of about 0.02 to about 0.12;

said non-symmetrical modular mixing element has a base half-width $X_o$ measured perpendicular to said radial distance $R_o$; and said non-symmetrical modular mixing element has a wing aspect ratio $X_o/R_o$ in a range of about 0.6 to about 0.7.

20. A non-symmetrical modular mixing element for removably mounting on a rotationally-driven screw shaft of an extrusion-compounding machine in keyed relation to said shaft wherein:

said non-symmetrical modular mixing element has an axial bore for receiving said shaft and has an axis of rotation concentric with said axial bore;

said axial bore having at least one keyway;

said non-symmetrical modular mixing element being configured for removably mounting on such a screw shaft for installation in an extrusion-compounding machine designed for two intermeshing co-rotating screws to be positioned in respective barrel sections of two adjoining and substantially cylindrical barrel sections each having a barrel surface inner radius $R_B$;

said non-symmetrical modular mixing element having two non-symmetrical wings located on opposite sides of said axis of rotation;

each of said wings having a leading face and a trailing face with a wing tip intermediate said leading and trailing faces;

said leading face having a convex portion adjoining the wing tip along a first corner;

said convex portion of the leading face having a radius $R_1$ extending from a leading face center point;

a first radial line extending from said leading face center point to said first corner defining an angle $\alpha$ with a second radial line extending from said axis of rotation to said first corner;

said angle $\alpha$ being in a range from about 5° to about 25°;

said trailing face adjoining the wing tip along a second corner;

a geometric straight line extended from said trailing face at said second corner and being a straight extension of said trailing face at said second corner to a point on the barrel inner surface defining an angle $\beta$ with a tangent to the barrel inner surface at said point; and said angle $\beta$ being in a range of about 10° to about 90°.

21. A non-symmetrical modular mixing element as claimed in claim 20, wherein:

said wing tip is at a radial distance $R_o$ from said axis of rotation;

said non-symmetrical modular mixing element has a base half-width $X_o$ measured perpendicular to said radial distance $R_o$; and said non-symmetrical modular mixing element has a wing aspect ratio $X_o/R_o$ in a range of about 0.5 to about 0.8.

22. A non-symmetrical modular mixing element as claimed in claim 21, wherein:

said leading face center point is offset a distance $X_1$ measured perpendicular to said radial distance $R_o$; and said base half-width $X_o$ equals said radius $R_1$ of said convex portion of the leading face minus said offset distance $X_1$.

\* \* \* \* \*